(12) United States Patent
Golz et al.

(10) Patent No.: US 9,346,137 B2
(45) Date of Patent: May 24, 2016

(54) MACHINE TOOL AND METHOD FOR MACHINING A WORKPIECE

(75) Inventors: Hans-Ulrich Golz, Plauen (DE); Thomas Bayha, Markgroeningen (DE); Tobias Abeln, Stuttgart (DE)

(73) Assignee: MAG IAS GmbH, Goeppingen (DE)

( * ) Notice: Subject to any disclaimer, the term of this patent is extended or adjusted under 35 U.S.C. 154(b) by 0 days.

(21) Appl. No.: 13/584,982

(22) Filed: Aug. 14, 2012

(65) Prior Publication Data

US 2013/0152374 A1 Jun. 20, 2013

Related U.S. Application Data

(63) Continuation of application No. PCT/EP2011/051445, filed on Feb. 2, 2011.

(30) Foreign Application Priority Data

Feb. 17, 2010 (DE) .......................... 10 2010 002 019

(51) Int. Cl.
*B23P 23/00* (2006.01)
*B23Q 3/157* (2006.01)
*B23B 29/034* (2006.01)
*B23B 31/26* (2006.01)
(Continued)

(52) U.S. Cl.
CPC ........... *B23P 23/00* (2013.01); *B23B 29/03417* (2013.01); *B23B 31/266* (2013.01); *B23P 23/04* (2013.01); *B23Q 3/157* (2013.01); *B24B 23/02* (2013.01); *B24B 33/02* (2013.01); *B24B 33/08* (2013.01); *B24B 33/10* (2013.01); *Y10T 29/49996* (2015.01); *Y10T 29/5105* (2015.01); *Y10T 29/5107* (2015.01); *Y10T 408/385* (2015.01); *Y10T 408/8588* (2015.01);

(Continued)

(58) Field of Classification Search
CPC .............. Y10T 29/5174; Y10T 82/125; Y10T 409/309464; Y10T 483/15; Y10T 483/17; Y10T 483/1748; B23Q 3/157; B23P 23/00; B23P 23/02; B23P 23/04; B24B 33/10
USPC ......... 483/13, 16, 36; 409/233; 82/1.4; 29/55
See application file for complete search history.

(56) References Cited

U.S. PATENT DOCUMENTS 3,530,745 A * 9/1970 Milewski ....................... 408/158
4,416,569 A * 11/1983 Yamakage et al. ................. 408/4
(Continued)

FOREIGN PATENT DOCUMENTS

DE 19734631 A1 * 2/1999
DE 692 28 175 9/1999
(Continued)

*Primary Examiner* — Erica E Cadugan
*Assistant Examiner* — Michael Vitale
(74) *Attorney, Agent, or Firm* — Womble Carlyle Sandridge & Rice LLP

(57) ABSTRACT

A machine tool including a tool spindle, to which a tool can be detachably fixed and by means of which the tool can be rotated, and a workpiece support is provided, the tool spindle and the workpiece support being displaceable relative to one another, characterized in that the tool spindle includes a loading device, which acts on a linearly movable rod of a tool fixed to the tool spindle. The tool spindle includes a motor device coupled to the loading device, which drives linear displacement of the rod. The machine tool includes a set of tools by means of which different machining operations can be conducted on a workpiece, wherein the tools can each be fixed to the tool spindle and the tools each have a rod on which the loading device of the tool spindle acts when a tool is fixed to the tool spindle.

29 Claims, 6 Drawing Sheets

(51) Int. Cl.
*B24B 33/02* (2006.01)
*B24B 33/08* (2006.01)
*B24B 33/10* (2006.01)
*B24B 23/02* (2006.01)
*B23P 23/04* (2006.01)

(52) U.S. Cl.
CPC .............. *Y10T409/304088* (2015.01); *Y10T 409/307168* (2015.01); *Y10T 409/309464* (2015.01); *Y10T 483/15* (2015.01); *Y10T 483/174* (2015.01); *Y10T 483/1733* (2015.01); *Y10T 483/1748* (2015.01); *Y10T 483/1783* (2015.01)

(56) References Cited

U.S. PATENT DOCUMENTS

| | | | |
|---|---|---|---|
| 4,463,490 A * | 8/1984 | Saito et al. | 29/566.1 |
| 5,095,662 A * | 3/1992 | Grimm et al. | 451/5 |
| 5,782,586 A * | 7/1998 | Geissler | 408/56 |
| 6,345,937 B1 * | 2/2002 | Kress et al. | 408/1 R |
| 7,070,491 B2 * | 7/2006 | Becksvoort | 451/470 |
| 2006/0052038 A1 * | 3/2006 | Klein | 451/11 |
| 2010/0105292 A1 * | 4/2010 | Nagel et al. | 451/8 |
| 2011/0166692 A1 | 7/2011 | Horn et al. | |

FOREIGN PATENT DOCUMENTS

| | | | |
|---|---|---|---|
| DE | 3918034 C2 * | 11/2000 | |
| DE | 102006028728 A1 * | 12/2007 | |
| DE | 102007045045 A1 * | 3/2009 | |
| GB | 1259071 A * | 1/1972 | |
| JP | 58202741 A * | 11/1983 | |
| JP | 61164738 A * | 7/1986 | |
| JP | 09254009 A * | 9/1997 | |
| WO | WO 2009129925 A1 * | 10/2009 | |

* cited by examiner

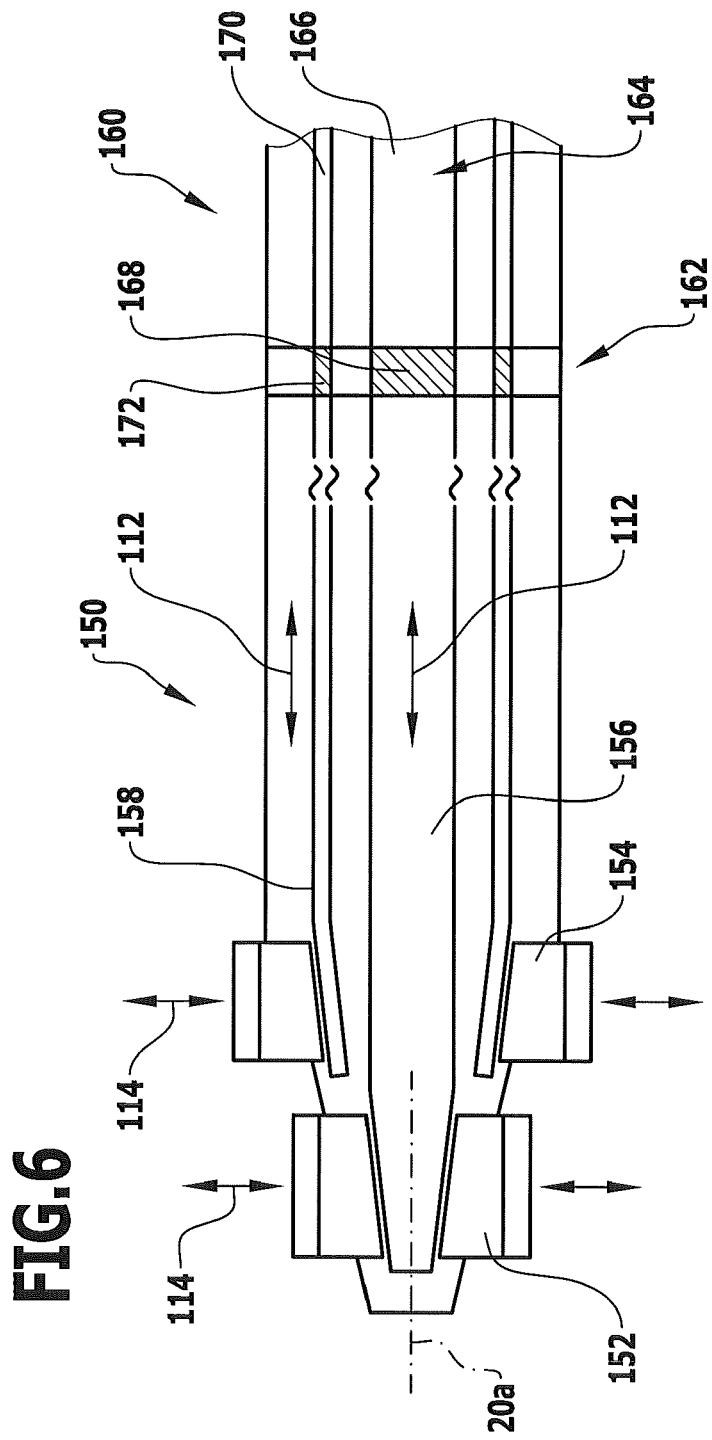

MACHINE TOOL AND METHOD FOR MACHINING A WORKPIECE

CROSS-REFERENCE TO RELATED APPLICATIONS

This application is a continuation of International Appl. No. PCT/EP2011/051445, filed on Feb. 2, 2011, and claims the benefit of German Appl. No. 10 2010 002 019.2, filed on Feb. 17, 2010, which are incorporated herein by reference in their entirety and for all purposes.

FIELD OF THE INVENTION

The invention relates to a machine tool comprising at least one tool spindle, to which a tool is detachably fixable and by means of which the tool is rotated, and a workpiece support, wherein the at least one tool spindle and the at least one workpiece support are displaceable relative to one another. In addition, the invention relates to a method for machining a workpiece with different tools.

BACKGROUND OF THE INVENTION

A method for fine machining inside surfaces of bores in workpieces by precision drilling and subsequent honing with the steps: precision drilling of a bore of a workpiece by means of a precision drilling tool of a precision drilling device and transfer of the workpiece into a machining position of a honing device for machining the precision-drilled bore by means of a honing tool of the honing device is known from document DE 10 2006 034 497 A1.

A method for fine machining a workpiece is known from DE 10 2007 045 045 A1, in which the workpiece is fixed to a workpiece support of a machine tool and the workpiece is pre-machined in its state fixed to the workpiece support and the pre-machined workpiece is honed by means of a honing tool.

A honing tool for finish-honing bores in a workpiece with at least one honing stone retainer, an adjusting device for adjusting the diameter of the honing tool in the region of the at least one honing stone retainer, an interface for connecting the honing tool to a conventional machine spindle or a conventional adapter, intermediate piece thereof and a drive unit integrated into the honing tool for operating the adjusting device, is known from DE 10 2006 028 728 A1.

A method for material-removal machining a workpiece to create a non-level surface, in particular a valve seat, by means of a tool with a base body having a blade member held by a mounting is known from DE 198 59 051 A1.

A spindle unit for machine tools is known from EP 0 780 192 B2.

A honing tool with a fluid actuator is known from U.S. Pat. No. 7,070,491 B2.

A tool holder comprising a slide, to which a tool can be fixed, is known from GB 1 259 071. The slide is radially movable in relation to a part that can be fixed to a rotatable spindle of a machine tool. A reversible electric motor that drives the relative radial movement is mounted in this part.

A machine for superfinishing workpieces by honing with a honing spindle, which is mounted in a spindle housing and can be driven by an electric motor, the stroke movement of which spindle is effected by a linear motor, on the movable secondary part of which the spindle housing is arranged, and in which an expanding rod, which serves to expand a honing tool arranged on the honing spindle, is arranged in the honing spindle to rotate therewith and to be axially displaceable therein by means of the servomotor, is known from DE 102 25 514 B4.

A cutting tool for machining inner contours and outer contours on a workpiece with at least one cutter support, which is clamped against a supporting surface on a tool base body by a clamp bolt, and at least one thrust piece, which serves to position the cutter support on the supporting surface and for additional support against machining pressure in the adjusted position and is displaceably mounted in at least one bore opening at a side wall, and which thrust piece can be pressed against a supporting wall of the tool body located opposite the side wall by means of an actuator, is known from DE 39 18 034 C2.

SUMMARY OF THE INVENTION

In accordance with an embodiment of the invention, a machine tool is provided which allows extensive machining possibilities for workpieces with optimized machining quality with minimized time expenditure.

In accordance with an embodiment of the invention, it is provided that at least one tool spindle comprises a loading device, which acts on at least one linearly movable rod of a tool, said tool being fixed to the at least one tool spindle, that the at least one tool spindle comprises a motor device, which is coupled to the loading device and drives a linear displacement arrangement of the at least one rod by means of the loading device, and that a set of tools is provided, which comprises at least one first tool and one second tool, by means of which different machining operations can be conducted on a workpiece, wherein the tools can each be fixed to the at least one tool spindle and the tools each have at least one rod, on which the loading device of the at least one tool spindle acts when a tool is fixed to the at least one tool spindle.

A relative movement and in particular relative displacement between the at least one tool spindle and the workpiece support enables a stroke movement between a workpiece and a tool for machining the workpiece to be performed on the machine tool. In particular, an oscillating stroke movement can be performed. In this case, this relative stroke movement between the workpiece and the tool can be achieved by displacement of the tool alone, by displacement of the workpiece alone or by a combination of workpiece displacement and tool displacement.

The loading device can be moved by means of the motor device. As a result, the at least one displaceable rod can in turn be moved on a tool. In particular, a transverse movement (to a stroke movement) of a tool element acting directly on a workpiece can be achieved by means of the at least one displaceable rod.

It is thus possible, for example, to use a honing tool, wherein a contact pressure onto a workpiece is adjustable by the corresponding positioning of the at least one movable rod of the tool.

It is additionally possible, for example, to conduct a preliminary machining operation on a workpiece before the honing, wherein cutting edge wear can be compensated, for example, by a corresponding transverse adjustment by means of the at least one rod or following a measurement of a bore diameter, for example, a preliminary machining tool such as a precision drilling tool can be adjusted in a defined manner by means of the transverse adjustment to obtain a high machining quality.

It is possible to provide different types of transverse adjustments on the tool. For example, a transverse adjustment of two separate cutting edge arrangements can be provided if the loading device of a tool spindle and the tool are configured accordingly as counterpart. For example, a tool can comprise two rods guided coaxially to one another to be able to adjust two cutting edge arrangements. It is also possible, for example, that a tool comprises a rod to be able to adjust a cutting edge arrangement. The tool can comprise a second cutting edge arrangement, for example, which is adjustable by means of a fluid actuator.

It is possible on the machine tool according to the invention to subject a workpiece to a first machining operation such as a precise drilling operation and a subsequent second machining operation and in particular to a honing operation in the same chucking operation. As a result, a high machining quality can be achieved with a minimized time expenditure. By means of the machine tool according to the invention, a workpiece can be machined in different ways without changing the chucking arrangement and in particular different machining operations can be combined. For example, a preliminary machining operation can occur by drilling, reaming or peeling with a subsequent machining by honing.

The machine tool according to the invention is configured in particular as a machining centre. A honing tool can then be coupled rigidly to the tool spindle and in particular a honing operation can then also be conducted with a horizontally oriented tool spindle.

The motor device in particular comprises an electric motor such as a torque motor, for example. The loading device can be driven by this and in turn a movement and positioning of the at least one rod of the tool can occur as a result.

The motor device is coupled to the loading device, for example, by means of a ball screw drive. A rotational movement can be converted into a linear movement in a simple manner by means of a ball screw drive. The loading device can thus be formed as a rod, for example, or it comprises at least one rod, which can act directly on the at least one linearly movable rod of a tool. It is also possible, for example, that the motor device comprises a linear motor, which acts on the loading device accordingly.

In a structurally simple embodiment the loading device has at least one linearly movable rod, to which the at least one rod of the tool can be coupled. The at least one rod of the tool can then be coupled to the loading device of the corresponding tool spindle in a simple manner. The at least one rod of the tool can be positioned in a simple manner by the positioning of the at least one rod of the tool spindle.

In particular, the at least one rod of the tool is a push rod or push-pull rod, by means of which at least one tool element is adjustable. The tool acts on the workpiece by means of the tool element. The tool element is a cutting edge or cutting edge arrangement, for example. In the case of the configuration of the at least one rod of the tool as a push rod this can be displaced by action of the loading device of the tool spindle when this exerts a pressure. The at least one rod of the tool is restored by a spring device, for example, when the loading device does not exert any pressure. In the case of the configuration as a push-pull rod the loading device determines the position of the at least one rod of the tool both during the feed motion and the reverse feed motion.

The at least one tool element is a cutting edge or a cutting edge arrangement or comprises such. For example, the corresponding tool is a precision drilling tool with corresponding cutting edges. The tool can also be a honing tool with a cutting edge arrangement, which is multiple-edged and in particular comprises honing stones.

It is most particularly advantageous if the set of tools comprises at least one preliminary machining tool (as first tool) and a honing tool (as second tool). This results in extensive machining possibilities. For example, one or more honing stone retainers of the honing tool can be controlled by means of the at least one rod of the tool. In particular the contact pressure of the tool on a workpiece can be adjusted as a result of this. It is possible in one chucking operation of a workpiece to firstly conduct a preliminary machining operation and then a honing machining operation. A bore diameter can be determined by means of the honing tool, in particular by means of a dynamic pressure measurement. This result can then be used to readjust the preliminary machining tool for a subsequent workpiece by means of the at least one rod.

In particular, the set of tools comprises at least one precision drilling tool. For example, a precision drilling of a bore such as cylinder bore can be conducted as a result of this. A honing of the bore can then be conducted with a honing tool. As a result of the machine tool according to the invention a plurality of machining operations or a combination of machining operations can be conducted in particular in the same chucking operation. For example, bores on a crankshaft, a lapped bearing, for a valve seat and valve bushing or for a cylinder can be produced and a precision drilling can be conducted with a first tool. A subsequent machining of the workpiece can occur without changing the chucking arrangement. For example, a reaming, peeling, honing operation etc. occurs.

It is favorable if the tools each have at least one cutting edge or cutting edge arrangement, which is coupled to the at least one rod of the tool, wherein the at least one cutting edge or cutting edge arrangement is adjustable in a direction transverse to a rotational axis by means of the at least one rod. As a result, a tool element of the tool can be advanced to a workpiece. The machining operation can be optimized as a result of this, depending on the type of tool. For example, in the case of a precision drilling tool a cutting edge readjustment can be conducted to compensate cutting edge wear or a readjustment can be achieved for optimized dimensioning of a bore. In the case of a honing tool the contact pressure can be adjusted.

In particular, the at least one tool spindle is oriented horizontally in relation to a direction of gravity. For example, the removal of cuttings can be optimized as a result of this. If the tool is held rigidly on the at least one tool spindle, a horizontal machining operation can be conducted. In particular, a horizontal honing machining operation can be conducted.

A tool changing device that is part of the machine tool is advantageously provided. Thus, a change to a second tool such as a honing tool can occur after a preliminary machining operation, for example, in a time-optimized manner.

It is favorable if a cleaning device is provided to clean a workpiece after a machining operation with a first tool before the machining with a second tool. As a result of this, for example, cuttings resulting from a preliminary machining operation can be prevented from remaining on the workpiece and causing uncontrolled scoring during a honing operation.

In one embodiment a fluid jet device and/or laser device is provided. In this case, the fluid jet device can be part of a cleaning device in order to clean a workpiece by means of one or more fluid jets. A fluid jet honing operation can also be provided, for example. The laser device allows a workpiece to be machined separately by the tools on the tool spindles. For example, a laser structuring operation can be conducted.

It is advantageous when the cleaning device and/or the fluid jet device and/or the laser device is arranged on a front side of the machine tool and can be approached by the workpiece support. As a result, the corresponding device lies at the edge of a work area and not in the area of movement of the at least one tool spindle.

In an advantageous embodiment a standard interface is provided for a tool on the at least one tool spindle. In particular, this standard interface is a hollow shaft cone interface.

It is also favorable if the at least one tool spindle has a compressed air interface. As a result, compressed air can be provided to a tool by means of the machine tool. This compressed air can be used, for example, for blowing or also for pressure measurements and in particular dynamic pressure measurements.

Accordingly, it is provided that a tool has an interface for coupling in compressed air. As a result, a tool can act on a workpiece pneumatically, for example, in order to conduct a pneumatic pressure measurement or to clean the workpiece.

It is then favorable if a tool has at least one outlet for compressed air. Compressed air can be blown out through this, for example, to blow onto a workpiece. The diameter of this bore can then be determined by measuring the dynamic pressure.

A machine tool according to the invention is configured as a machining centre, for example. In this case, a relative movability between a tool and a workpiece in the three spatial directions is advantageously provided. Additional possibilities of movement around rotational axes can be provided. Extensive machining possibilities thus result.

In particular, a control device is provided, by which a position of the at least one rod of the tool is adjustable by means of the loading device. The control device is, for example, part of the master control system of the machine tool. By corresponding control of the motor device the loading device can be controlled and this in turn orients the position of the rod. In this way, the contact pressure of a tool can be adjusted, for example.

In one embodiment at least one tool is provided, which has at least one first tool element and one second tool element, which are adjustable independently of one another by the loading device and in particular can be advanced independently of one another. This results in extensive machining possibilities on a workpiece. For example, two different machining operations can thus be conducted on a workpiece. An example of a corresponding tool is a honing tool, which has different sets of honing stone retainers.

An additional object forming the basis of the invention is to provide a method of the aforementioned type, with which an optimized workpiece machining results.

This object is achieved according to the invention with the aforementioned method in that the workpiece is held in the same chucking arrangement and the workpiece is machined firstly with a first tool and then with a second tool, wherein the first tool and the second tool are respectively held on a tool spindle, and the tool spindle effects the rotation of the corresponding tool and by means of a motor device integrated into the tool spindle acts on at least one linearly movable rod of the corresponding tool and displaces this, wherein the linear displacement of the at least one rod effects a transverse movement of at least one cutting edge or cutting edge arrangement of the corresponding tool in relation to a rotational axis of the tool.

The method according to the invention has the advantages already explained in association with the machine tool according to the invention.

Because the workpiece is held in the same chucking arrangement during the machining with the first tool and during the machining with the second tool, i.e., does not have to be rechucked, an optimized machining quality with minimized machining time is obtained.

The workpiece machining can be controlled in a specific manner by the motor device integrated into the tool spindle. For example, a contact pressure on the workpiece can be adjusted. There also result extensive readjustment possibilities for a tool.

In particular, the displacement of the at least one rod occurs in a controlled manner so that a defined displacement is made possible.

For example, by the displacement of the at least one rod a contact pressure of the tool on a workpiece is adjusted or wear of a tool is compensated.

In one advantageous embodiment the first tool is a precision drilling tool. As a result, a bore such as a cylinder bore can be machined by precision drilling, for example. In a particularly advantageous embodiment the second tool is a honing tool. A honing operation can then be conducted on a workpiece without the workpiece having to be rechucked between a preliminary machining operation such as precision drilling or honing.

It is most particularly advantageous if the workpiece is cleaned after machining with the first tool and before machining with the second tool. As a result, cuttings formed during the machining with the first tool, for example, can be prevented from remaining on the workpiece.

If, for example, a honing operation is to be conducted, then such cuttings can lead to undefined scoring. The cleaning of the workpiece can occur in the time in which a tool change is conducted between the first tool and the second tool.

It is favorable if the first tool and the second tool are held by the same tool spindle one after the other in time. Change to the second tool occurs after the workpiece machining with the first tool is finished on the corresponding tool spindle. This enables an optimized workpiece machining operation to be conducted. In connection therewith, it is also possible in principle that, if the machine tool has a first tool spindle and a second tool spindle (double-spindle arrangement), for example, these hold different tools and a workpiece machining operation is firstly conducted with the first tool and then with the second tool in an operation without tool change.

In one embodiment the machining occurs at least partially by means of a water-miscible cooling lubricant or with honing oil.

It is most particularly advantageous if a diameter measurement of a bore is conducted by means of a dynamic pressure measurement. The results can then be used for a precision drilling operation on the following workpiece, for example, to adjust the precision drilling tool by means of the corresponding at least one rod such that the settings are complied with.

BRIEF DESCRIPTION OF THE DRAWINGS

The following description of preferred embodiments serves to explain the invention in more detail in association with the drawings.

FIG. 6 is a schematic sectional representation of a further exemplary embodiment of a tool.

DETAILED DESCRIPTION OF THE INVENTION

Figure 1:
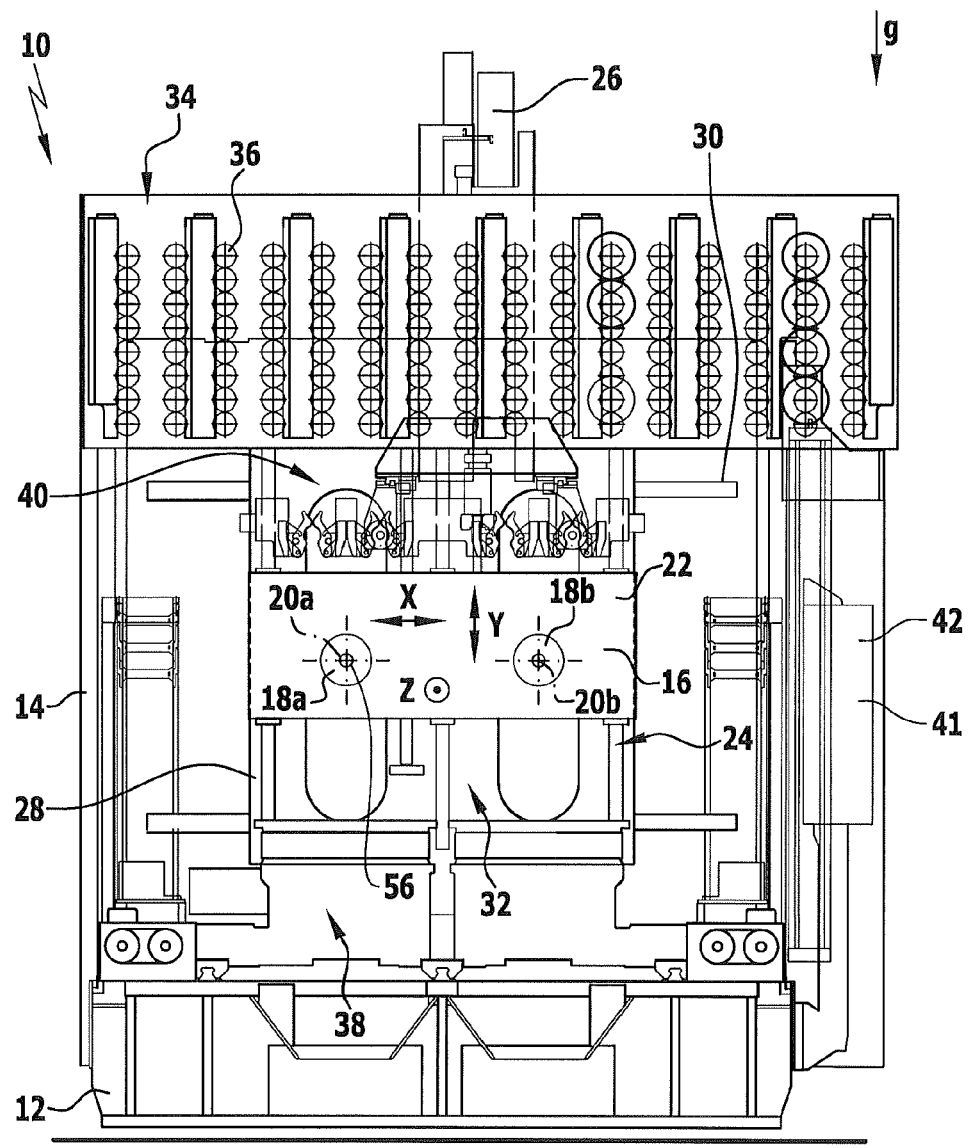
FIG. 1 is a schematic partial representation of an exemplary embodiment of a machine tool according to the invention.
Figure 2:
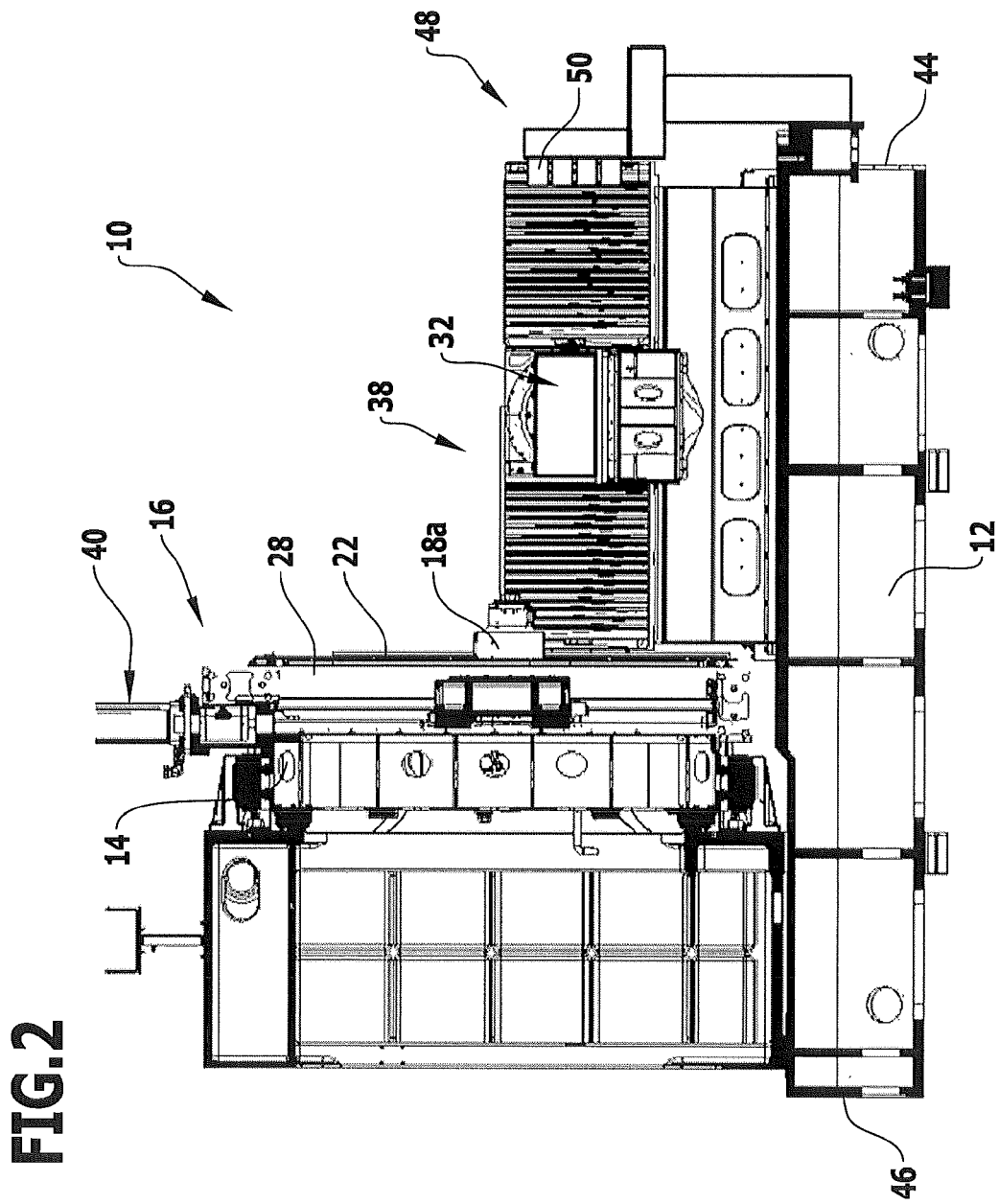
FIG. 2 is a side view of the machine tool according to FIG. 1 without cladding.

An exemplary embodiment of a machine tool according to the invention is a machining centre. An embodiment of a machining centre, which is shown schematically in partial representation in FIGS. 1 and 2 and given the reference 10 there, comprises a machine bed 12, on which a machine frame 14 is arranged. The machine frame 14 is configured in the manner of a portal and projects beyond the machine bed 12 in a vertical direction in relation to the direction of gravity g. A tool support arrangement 16, which comprises at least one tool spindle 18, is held on the machine frame 14.

In the shown exemplary embodiment the tool support arrangement 16 comprises a first tool spindle 18*a* and a second tool spindle 18*b*. A tool held on the respective tool spindles 18*a*, 18*b* is rotatable around a rotational axis 20*a*, 20*b*. In the representation according to FIG. 1 the rotational axes 20*a*, 20*b* lie parallel to one another. They are oriented parallel to a Z direction, which is perpendicular to the plane of the drawing in the representation according to FIG. 1. In particular, the Z direction is a horizontal direction in relation to the direction of gravity g.

The tool support arrangement 16 is configured as a slide 22, which is held on a slide guide 24 and is linearly movable by means of the slide guide 24 in a Y direction (direction and opposite direction). The Y direction is transverse and in particular perpendicular to the Z direction. In particular, the Y direction is a vertical direction in relation to the direction of gravity g.

To drive the movement of the slide 22 in the Y direction and for the positioning thereof the slide 22 has an associated drive device 26. This can comprise a ball screw drive or a linear motor, for example.

The slide 22 is itself held on a slide 28, which is linearly displaceable in an X direction (direction and opposite direction) on a slide guide 30. A corresponding drive is provided for the displacement and positioning. The X direction is transverse and in particular perpendicular to the Y direction and the Z direction. In particular, the X direction is a horizontal direction in relation to the direction of gravity g.

On the machine bed 12 there is arranged (at least) one workpiece support 32. The first tool spindle 18*a* and the second tool spindle 18*b*, and therewith tools held thereon and the workpiece support 32, are movable relative to one another in the Z direction (direction and opposite direction). A workpiece held on the workpiece support 32 and the tool spindles 18*a* or 18*b* are therefore displaceable relative to one another in the X direction as first direction, the Y direction as second direction and the Z direction as third direction.

In one exemplary embodiment the tool spindles 18*a*, 18*b* are not moveable in the Z direction for machining a workpiece and the workpiece support 32 is displaceably held on the machine bed in the Z direction. The workpiece support 32 has an associated drive for this.

In an alternative exemplary embodiment the first tool spindle 18*a* and the second tool spindle 18*b* are held displaceably on the tool support arrangement 16 to allow a Z displaceability.

It is also possible to combine a Z displaceability of the tool spindles 18*a*, 18*b* on the tool support arrangement 16 and a Z displaceability of the workpiece support 32 on the machine bed.

For example, it can also be provided that the workpiece support 32 is rotatable around a vertical axis, for example.

In the illustrated exemplary embodiment the machining centre 10 has a storage arrangement 34 for tools 36 arranged above a work area 38, in which workpieces are machined.

In addition, a tool changing device 40 is provided, by means of which tools 36 can be inserted onto the tool spindles 18*a* and 18*b* and removed therefrom.

A corresponding machining centre is described in WO 2009/033920 A1, for example. Reference is made to this publication and this publication is made part of the disclosure.

The machining centre 10 can also comprise only a single tool spindle or comprise more than two tool spindles.

The machining centre 10 has a control device 41, which is arranged at least partially in a switch box 42. Sequences of the workpiece machining operation are controlled by means of the control device 41.

The machining centre 10 has a front side 44 and a rear side 46. The work area 38 faces towards the front side 44.

In one exemplary embodiment one or more additional devices 48 are arranged on the front side 44. A workpiece can be worked on by means of an additional device 48 on tool spindles 18 in addition to tools.

In one exemplary embodiment a cleaning device 50 is provided as an additional device 48. A workpiece can be moved by means of the workpiece support 32 to the cleaning device 50. There, the workpiece can be cleaned after a first machining operation before a second machining operation, for example. The machining quality can be improved as a result. The cleaning occurs, for example, by blowing or by direct action of a cleaning device.

The additional device 48 can also be formed, for example, by a fluid jet device or comprise such a device. A workpiece can be subjected to the fluid jet by means of the fluid jet device. The fluid jet can be a gas jet and/or liquid jet. With an appropriate configuration, for example, a fluid jet honing operation can be conducted by means of this.

Alternatively or additionally hereto, for example, it can be provided that the additional device 48 is formed by a laser device or comprises such a device. It is thus possible, for example, to perform a laser structuring of a workpiece.

The additional device 48 or the additional devices 48 are arranged at an edge of the work area 38, e.g., on the front side 44, so that an additional device 48 does not hinder the relative movability between the workpiece support 32 and the tool spindles 18*a*, 18*b*.

Figure 3:
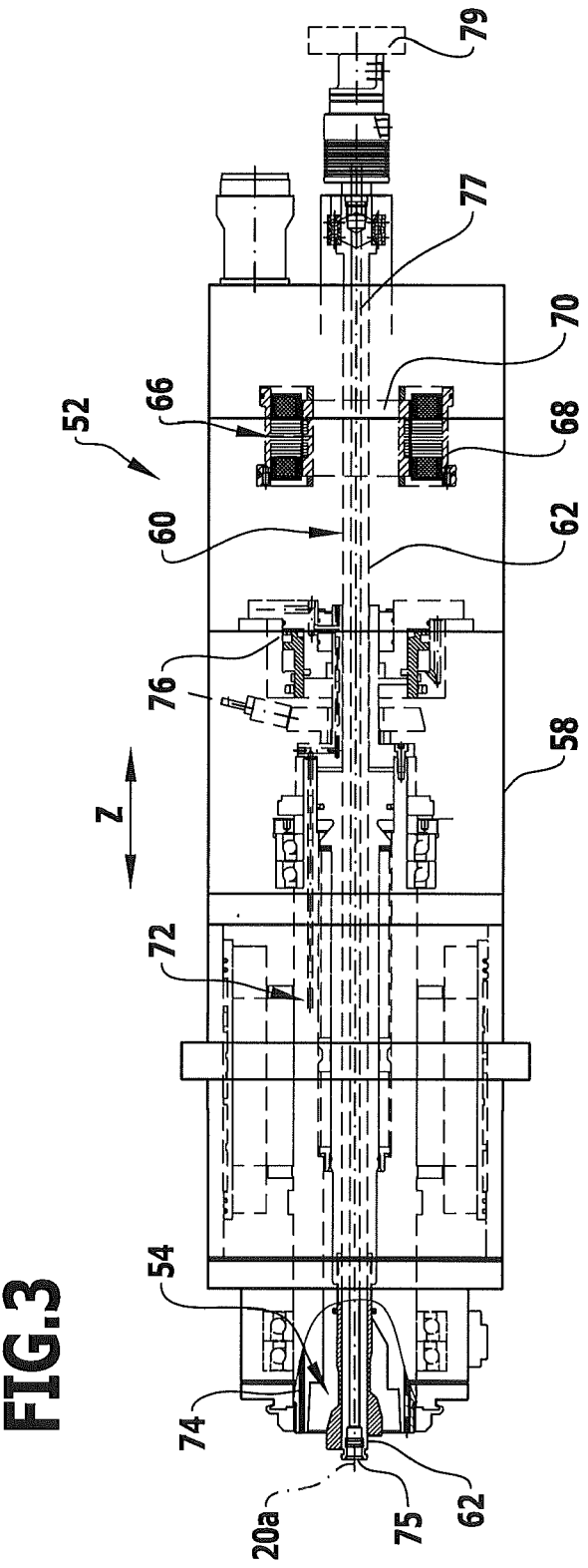
FIG. 3 is a schematic representation of an exemplary embodiment of a tool spindle.

An exemplary embodiment of a tool spindle, which is shown schematically in FIG. 3 and is given the reference 52 there, comprises an interface 54 for a tool. The interface 54 is configured, for example, as a hollow shaft cone (HSC) interface. At the interface 54 a tool (indicated with the reference 56 in FIG. 4) can be inserted into the tool spindle 52 and can be detachably fixed thereto. In this case, the fixture is fixed against rotation so that upon rotation of a corresponding rotatable part of the tool spindle 52 around the rotational axis 18*a*, for example, the tool 56 is rotated with it.

The tool spindle 52 comprises a housing 58. A loading device 60 is mounted in the housing 58 to be linearly displaceable. In particular, the loading device 60 comprises a linearly displaceable rod 62. A tool 56 has a rod 64, as will be explained in more detail below. When the tool 56 is fixed to the tool spindle 52 at the interface 54 the rods 62 and 64 are also coupled to one another. By controlled movement of the rod 62 of the tool spindle 52 the rod 64 of the tool 56 can then also be moved.

The tool spindle 52 comprises a motor device 66, which is arranged in the housing 58 of the tool spindle 52. The motor device 66 is integrated into the tool spindle 52. The motor device 66 comprises an electric motor 68, for example.

The motor device 66 is coupled to the rod 62 by means of a ball screw drive, for example, which is given the reference 70 in FIG. 3. The ball screw drive 70 enables a rotational movement of the motor device 66 to be converted into a linear movement of the rod 62.

A defined feed of the rod 62 of the tool spindle 52, and therewith also of the rod 64 of the tool 56, can be achieved by corresponding actuation of the motor device 66.

The control of the movement of the rod 62 by corresponding actuation of the motor device 66 occurs by means of a corresponding part of the control device 41. An electromechanical driven movement of the rod 62, and therewith of the rod 64, occurs by means of the electric motor 68.

The tool spindle 52 comprises a drive device given the overall reference 72, by means of which the interface 54 for the tool 56 can be rotated or turned around the rotational axis 20a, for example.

The tool spindle 52 has a compressed air interface 74 for the tool 56. The tool spindle 52 comprises an air supply device 76. This air supply device 76 is in fluidic connection with the compressed air interface 74. The corresponding tool 56 has a counter-interface to the compressed air interface 74. Compressed air can then be coupled into the tool 56 from the tool spindle 52. This compressed air can be used as blowing air or, as will be explained in more detail below, as measurement air in the case of a dynamic pressure measurement.

Moreover, the tool spindle 52 has an interface 75 for cooling lubricant, with which the tool 56 can be supplied. For example, there is formed in the rod 62 a duct 77 for cooling lubricant which is in fluidic connection with the interface 75 and a supply device 79 for cooling lubricant of the machine tool.

In one embodiment the machining is conducted at least partially with water-miscible cooling lubricant (emulsion) or with oil such as honing oil.

Figure 4:
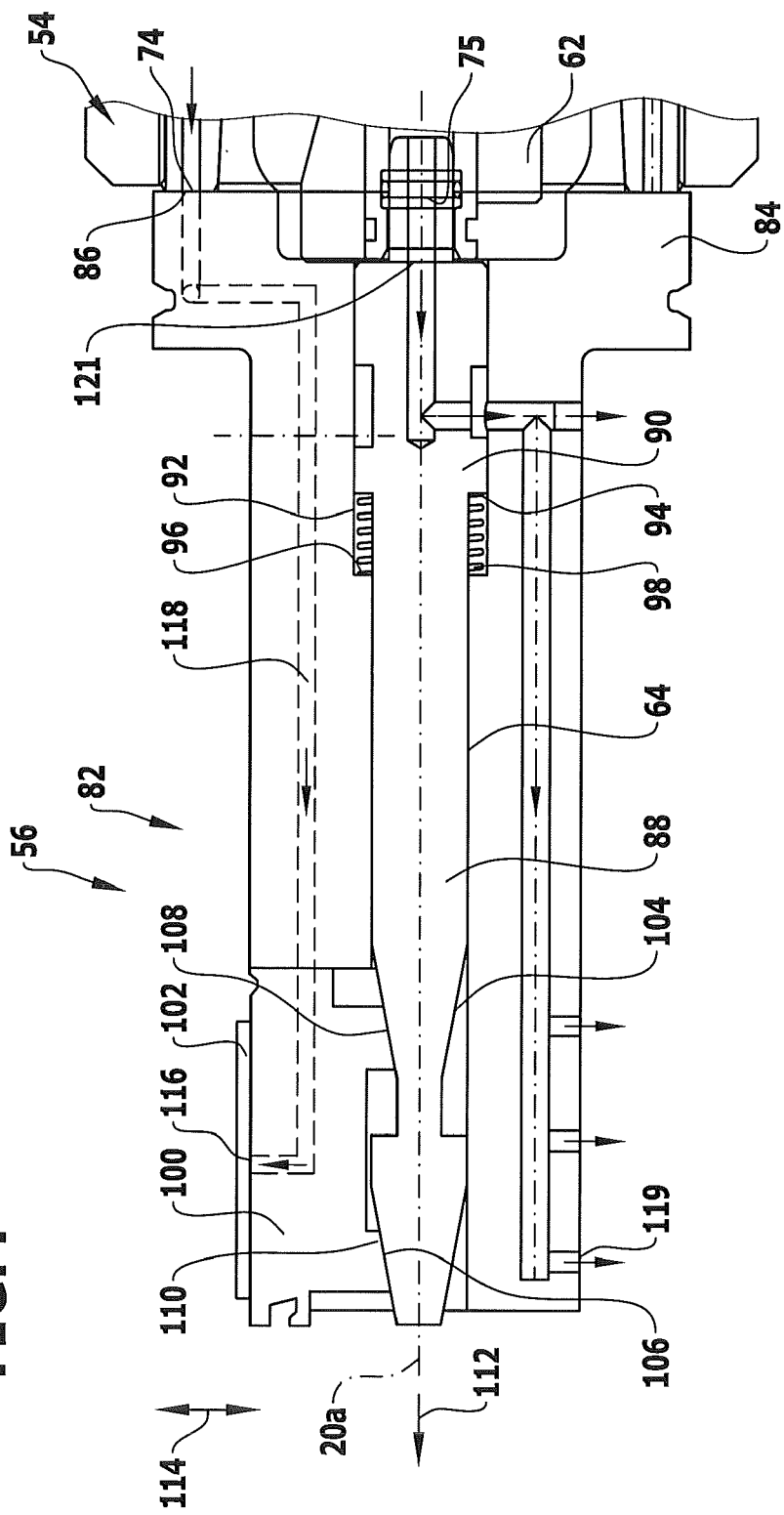
FIG. 4 is a schematic representation of an exemplary embodiment of a honing tool.

The machining centre 10 includes a set of tools, which comprises at least one first tool and in particular a preliminary machining tool 78 such as a precision drilling tool 80 (FIG. 5) and at least one second tool and in particular a honing tool 82 (FIG. 4). A workpiece fixed to a workpiece support 32 in the same chucking arrangement can be machined successively, for example, firstly by the precision drilling tool 80 and then further machined (if necessary, after cleaning on the cleaning device 50) by the honing tool 82.

An exemplary embodiment of a honing tool 82 (FIG. 4) comprises an interface 84 for the interface 54. Moreover, a compressed air interface 86 is provided for connection to the compressed air interface 74.

The honing tool 82 has a rod 88, which in particular is a push rod. The rod 88 can be coupled to the rod 62 of the tool spindle 52 when the honing tool 82 is fixed to the tool spindle 52.

The rod 88 has a region 90, which is positioned in a receiving area 92. The region 90 has a ring surface 94, which is directed towards the end 96 of the region 90. Between the ring surface 94 and the end 96 sits a spring device 98, which exerts a spring force that endeavors to push the region 90, and therewith the rod 88, away from the end 96. The force of the motor device 66, which assures a feed of the rod 62, and therewith the rod 88, opposes this spring force.

The honing tool 82 has (at least) one honing stone retainer 100, on which a cutting edge arrangement 102 sits. The cutting edge arrangement 102, by means of which the honing tool 82 acts on a workpiece, forms a corresponding honing element and is formed with multiple cutting edges. In particular, the cutting edge arrangement 102 comprises attached granules. Because of the cutting edge arrangement 102 there is a constant surface contact between the honing tool 82 and the workpiece during a honing operation. During the honing operation an oscillating change of direction of the longitudinal movement occurs between the honing tool 82 and the workpiece. In this case, this longitudinal movement is achieved by the relative movement between the workpiece support 32 and the tool spindle 52. The workpiece surfaces obtained during the honing operation have parallel intersecting score marks.

The honing stone retainer 100 is coupled to the rod 88. For example, the rod 88 has a first conical region 104 and a second conical region 106 for this. The honing stone retainer 100 is supported against the first conical region 104 with a first counter-cone region 108 and against the second conical region 106 with a second counter-cone region 110. A feed of the rod 88 in a direction 112 parallel to the rotational axis 18a causes a displacement of the honing stone retainer 100 in a direction 114 transverse, and in particular perpendicular to the direction 112. A corresponding position of the honing stone retainer 100 in relation to the direction 114 is determined by the position of the rod 88 in the direction 112. This position is secured by means of the motor device 66 in combination with the spring device 98. This position is in turn adjustable.

The cutting edge arrangement 102 can be advanced to a workpiece by changing the position of the rod 88 (effected by changing the position of the rod 62). A contact pressure of the honing tool 82 on the workpiece can be adjusted in a defined controlled manner.

For example, bores can be honed by the honing tool 82.

The honing tool 82 has one or more openings 116 for compressed air, which are in fluidic connection with the compressed air interface 86. Compressed air can be blown into a bore, for example, as a result of this. This opening or openings are in fluidic connection with the compressed air interface 86 by means of one or more ducts 118.

By pneumatic dynamic pressure measurement the diameter of a bore on the honing tool 82 can be measured by means of compressed air, for example. A re-measurement after a precision drilling operation, for example, (see below) by means of a separate measuring device such as a test mandrel is unnecessary as a result of this. The still provided honing tool is then also the measuring tool for determination of the diameter.

The honing tool 82 has one or more openings 119, which are in fluidic connection with a cooling lubricant interface 121 of the honing tool 82. The cooling lubricant interface 121 can be connected to the cooling lubricant interface 75 of the tool spindle 52. As a result of this, the honing tool 82 can be supplied with cooling lubricant during a machining operation.

Figure 5:
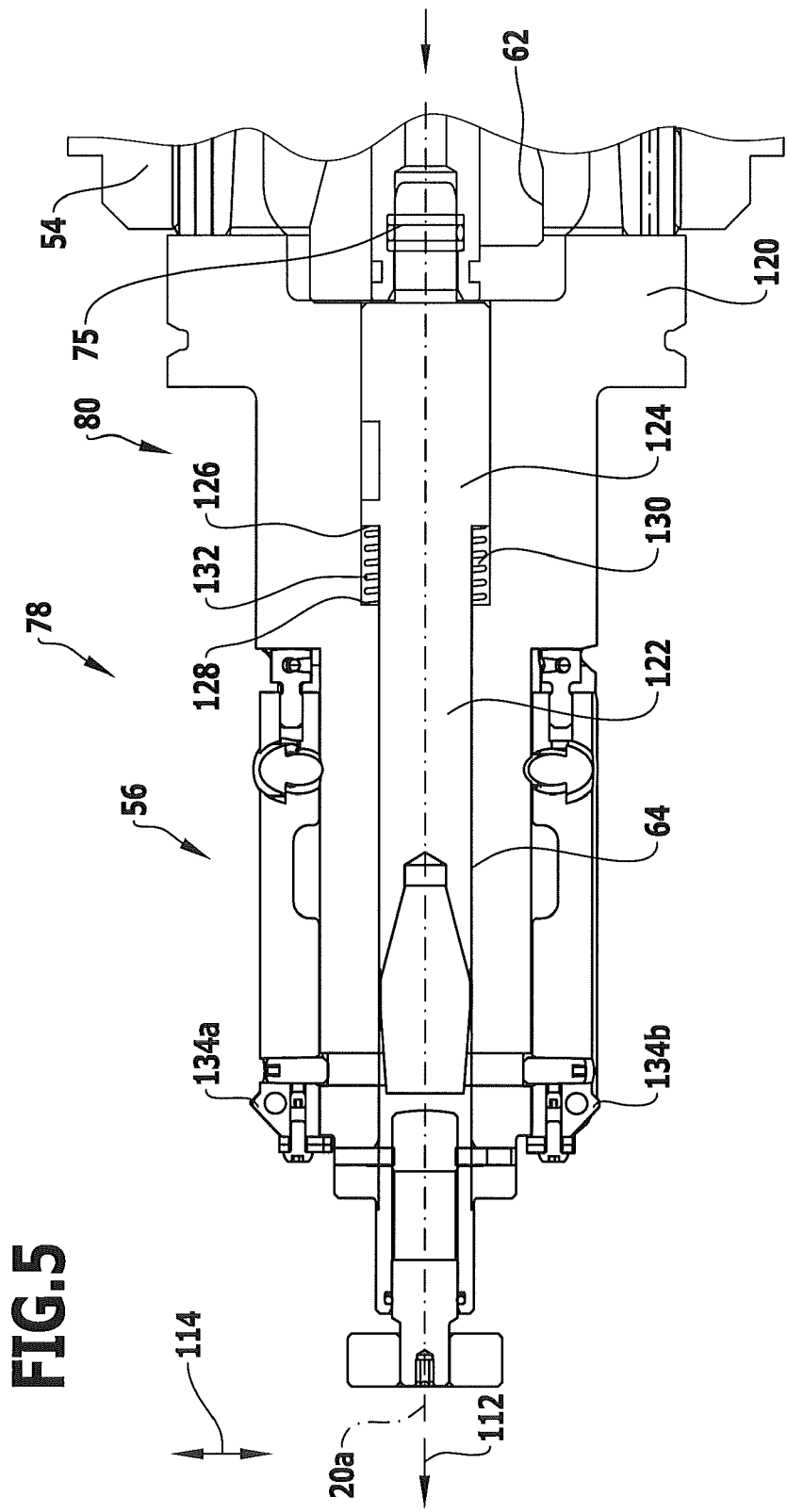
FIG. 5 is a schematic sectional representation of an exemplary embodiment of a precision drilling tool.

An exemplary embodiment of a preliminary machining tool is a precision drilling tool (FIG. 5). This precision drilling tool 80 comprises an interface 120 for coupling to the tool spindle 52.

The precision drilling tool 80 comprises a rod 122, which can be coupled to the rod 62 of the tool spindle 52.

The rod 122 has a widened region 124 with a ring surface 126 in a similar manner to the above-described rod 88. A spring device 132 sits between the ring surface 126 and an end 128 of a corresponding receiving area 130 for the region 124. This spring device is supported against the ring surface 126 of the region 124 and the end 128. The spring device 132 exerts a spring force, which tends to push the rod 122 in the direction of the tool spindle 52. The motor device 66 must act against this spring force.

The precision drilling tool 80 comprises cutting edges 134a, 134b. The cutting edges 134a, 134b are coupled to the rod 122. By feeding the rod 122 in a direction 112 parallel to a rotational axis 18a of the precision drilling tool 80 the cutting edges 134a, 134b can be adjusted in the direction 114 perpendicular to the direction 112 and in particular can be advanced to a workpiece. Cutting edge wear can be compensated and a bore diameter can be defined, for example, by such an advancing action.

Predetermined by the position of the rod 122, which is in turn adjusted in a controlled manner by the position of the rod 62, the cutting edges 134a, 134b are located in a specific position in the direction 114, wherein this position is adjusted in a defined controlled manner in the direction 114.

The machine tool according to the invention and the method according to the invention operate as follows:

One or more workpieces are machined in the machining centre 10.

For example, a preliminary machining operation such as precision drilling occurs on a cylinder bore. The precision drilling tool 80 is inserted on a tool spindle 18a or 18b when a workpiece or workpieces is/are clamped to the workpiece support 32.

The machining occurs as a result of relative movement (stroke movement) of the workpiece holder 32 and the tool spindles 18a, 18b, e.g. causing the cutting edges 134a, 134b to enter into a previously created bore on the workpiece for precision drilling.

In this case, the tool spindles 18a, 18b are motor spindles, which comprise the motor device 66. By means of this, by adjusting the position of the rod 62 the position of the rod 122 of the precision drilling tool 80 can be positioned in a specific manner in particular to be able to adjust the position transversely thereto in the direction 114 of the cutting edges 134a, 134b. This allows a bore diameter to be precisely adjusted and, for example, cutting edge wear to also be compensated.

After the precision drilling operation has finished, the workpiece or workpieces is/are moved, for example, to the cleaning device 50 by means of the workpiece support 32 and cleaned there. The cleaning is conducted, for example, by the action of fluid jets. This allows cuttings of the preliminary machining operation to be removed from the workpiece. In turn, in a subsequent honing operation undefined scoring as a result of these cuttings becoming embedded in honing stone retainers can be prevented.

After the precision drilling of a workpiece a change to honing tools 82 is made on the tool spindles 18a and 18b (in the case of a double-spindle arrangement). This change occurs, for example, at a parallel time to the cleaning.

The honing tools 82 are than inserted into corresponding bores of the workpieces. A determination of diameter can be performed by means of a dynamic pressure measurement.

The workpieces are then machined by honing. In this case, an oscillating stroke movement occurs between the workpiece support 32 and the tool spindles 18a, 18b.

In connection therewith, the transverse advance of one or more honing stone retainers 100 occurs by means of the rod 88, which in turn is coupled to the motor device 66 of the corresponding tool spindle 18a or 18b by means of the rod 62.

In the solution according to the invention the tools 56 sit rigidly on the tool spindle 52. The workpieces also sit rigidly on the workpiece support 32. The chucking arrangement is not changed during different machining steps.

A workpiece can be machined effectively in a time-saving manner. For example, cutting edge wear on the precision drilling tool 80 can be compensated by advancing by means of the motor device 66.

A honing tool 82 can determine the diameter of a bore after a preparation operation and forward the corresponding results to the control device 41. This can then ensure a readjustment of the cutting edges of the precision drilling tool 80 during the next preparation operation on the next workpiece.

The contact pressure on a workpiece is controllable by means of the motor device 66 during the honing operation by the honing tool 82.

It is also possible to perform more than two different machining operations on a workpiece within the machining centre 10 with the chucking arrangement of the workpiece on the workpiece support 32 unchanged.

An exemplary embodiment of a tool, which is shown in FIG. 6 and given the reference 150, comprises a set of first tool elements 152 and a set of second tool elements 154. The first tool elements 152 are coupled to a rod 156 and are transversely displaceable in the direction 114 by means thereof. The rod 156 itself is linearly displaceable in the direction 112. The rod 156 is guided in a hollow rod 158. This hollow rod 158 is also displaceable in the direction 112. It is coupled to the second tool elements 154, which are thus displaceable parallel to the direction 118.

The positions of the second tool elements 154 are adjustable in the direction 114 by means of the hollow rod 158. The positions of the first tool elements 152 are adjustable in the direction 114 by means of the rod 156. In this case, the position of the rod 156 and the position of the hollow rod 158 in the direction 112 are adjustable independently of one another, so that the transverse position of the first tool elements 152 and the transverse position of the second tool elements 154 are also adjustable independently of one another.

A corresponding tool spindle 160, which holds the tool 150, has an interface 162 for the tool 150.

The tool spindle 160 comprises a loading device, which is given the overall reference 164. The loading device 164 has a first part unit 166, which is configured, for example, as a rod and is linearly displaceable. The first part unit 166 can be coupled to the rod 156 by means of a first interface part unit 168 of the interface 162.

The loading device 164 additionally comprises a second part unit 170. This second part unit 170 comprises a hollow rod, for example, in which the first part unit 166 is guided. The second part unit 170 can be coupled to the hollow rod 158 of the tool 150 by means of a second interface part unit 172.

The tool 150 is rotatable as a unit around the rotational axis 18a or 18b with the set of first tool elements 152 and the set of second tool elements 154.

A double machining operation can be conducted on a workpiece by means of the tool 150.

The adjustability of a tool element can also be achieved in a different manner than by means of a rod. For example, the second tool elements 154 are adjusted by means of a rod and the adjustment of the first tool elements 152 is fluid-actuated.

LIST OF REFERENCE NUMERALS

10 machining centre
12 machine bed
14 machine frame
16 tool support arrangement
18a first tool spindle
18b second tool spindle
20a rotational axis
20b rotational axis
22 slide
24 slide guide
26 drive device
28 slide
30 slide guide
32 workpiece support
34 storage arrangement
36 tool
38 work area 40 tool changing device
41 control device
42 switch box
44 front side
46 rear side
48 additional device
50 cleaning device
52 tool spindle
54 interface
56 tool
58 housing
60 loading device
62 rod (tool spindle)
64 rod (tool)
66 motor device
68 electric motor
70 ball screw drive
72 drive device
74 compressed air interface
75 cooling lubricant interface
76 air supply device
77 duct
78 preliminary machining tool
80 precision drilling tool
82 honing tool
84 interface
86 compressed air interface
88 rod
90 region
92 receiving area
94 ring surface
96 end
98 spring device
100 honing stone retainer
102 cutting edge arrangement
104 first conical region
106 second conical region
108 first counter-cone region
110 second counter-cone region
112 direction
114 direction
116 opening
118 duct
119 opening
120 interface
121 cooling lubricant interface
122 rod
124 region
126 ring surface
128 end
130 receiving area
132 spring device
134a cutting edge
134b cutting edge
150 tool
152 first tool element
154 second tool element
156 rod
158 hollow rod
160 tool spindle
162 interface
164 loading device
166 first part unit
168 first interface part unit
170 second part unit
172 second interface part unit

The invention claimed is:

1. A machining center, comprising:
a set of tools which comprises at least a first tool and a second tool, by means of which different machining operations are conductible on a workpiece;
wherein the first tool is a drilling tool;
at least one tool spindle, to which one tool of the first tool and the second tool is detachably fixable and by means of which the first tool or the second tool is rotatable;
at least one workpiece support;
wherein the at least one tool spindle and the at least one workpiece support are displaceable relative to one another; wherein the at least one tool spindle is held on a support arrangement and is displaceable at least in a first direction and in a second direction lying transversely to the first direction;
wherein the at least one tool spindle comprises a housing;
wherein the at least one tool spindle comprises a loading device, which is mounted in the housing and which acts on at least one linearly movable rod of said first tool or second tool being fixed to the at least one spindle;
wherein the loading device has at least one linearly movable rod, to which the at least one linearly movable rod of the first tool and the second tool is couplable;
wherein the at least one tool spindle comprises a motor device, which is arranged in the housing and which is coupled to the loading device; and
wherein the motor device drives linear displacement of the at least one linearly moveable rod of the loading device, and the at least one linearly movable rod of the loading device in turn can drive linear displacement of the at least one linearly movable rod of the first tool and second tool.

2. The machining center according to claim 1, wherein the motor device comprises an electric motor.

3. The machining center according to claim 1, further comprising a machine bed, the at least one workpiece support being arranged on the machine bed, and the at least one workpeice support being displaceable on the machine bed in a third direction perpendicular to the first direction and the second direction.

4. The machining center according to claim 1, wherein the at least one linearly movable rod of the first tool and the second tool is a push rod or push-pull rod, by means of which at least one tool element is linearly movable.

5. The machining center according to claim 4, wherein the at least one tool element is or comprises a cutting edge or cutting edge arrangement.

6. The machining center according to claim 1, wherein the second tool is a honing tool.

7. The machining center according to claim 6, wherein the first tool and the second tool each have at least one cutting edge or cutting edge arrangement, which is coupled to the at least one linearly movable rod of the respective tool, wherein the at least one cutting edge or cutting edge arrangement is adjustable in a direction transverse to a rotational axis of the respective tool by means of the at least one linearly movable rod of the respective tool.

8. The machining center according to claim 1, wherein the at least one tool spindle is oriented horizontally in relation to a direction of gravity.

9. The machining center according to claim 1, wherein a tool changing device is provided.

10. The machining center according to claim 1, wherein a cleaning device for cleaning a workpiece after a machining operation with a first tool before a machining operation with a second tool is provided.

11. The machining center according to claim 1, wherein at least one of a fluid jet device and a laser device are provided.

12. The machining center according to claim 1, wherein at least one of a cleaning device, a fluid jet device, and a laser device is arranged on a front side of the machining center, said front side being approachable by the at least one workpiece support, and is adapted to be approached by the at least one workpiece support.

13. The machining center according to claim 1, wherein a hollow shaft cone interface on the at least one tool spindle is provided.

14. The machining center according claim 1, wherein the at least one tool spindle has a compressed air interface for a tool.

15. The machining center according to claim 1, wherein a at least one of the first tool and the second tool has an interface for coupling in compressed air.

16. The machining center according to claim 1, wherein at least one of the first tool and the second tool has at least one outlet for compressed air.

17. The machining center according to claim 1, wherein a control device is provided, by which a position of the at least one linearly movable rod of the first tool and the second tool is adjustable by means of the loading device.

18. The machining center according to claim 1, wherein at least one of the first tool and the second tool has at least one first tool element and the second tool element, which are adjustable independently of one another by the loading device.

19. The machining center according to claim 1, wherein the motor device is coupled to the loading device by a ball screw drive, which is arranged in the housing.

20. A method for machining a workpiece with different tools comprising:
providing a machining center comprising:
a set of tools which comprises at least first tool and a second tool, by means of which different machining operations are conductible on the workpiece;
wherein the first tool is a drilling tool;
at least on tool spindle, to which one tool of the first tool and the second tool is detachable fixable and by means of which the first tool or the second tool is rotatable;
at least one workpiece support;
wherein the at least one tool spindle and the at least one workpiece support are displaceable relative to one another, wherein the at least one tool spindle is held on a support arrangement and is displaceable at least in a first direction and in a second direction lying transversely to the first direction;
wherein the at least one tool spindle comprises a housing;
wherein the at least on tool spindle comprises a loading device, which is mounted in the housing and which acts on at least one linearly movable rod of said first tool or second tool being fixed to the at least one tool spindle;
wherein the loading device has at least one linearly movable rod, to which the at least one linearly movable rod of the first tool and second tool is couplable;
wherein the at least one tool spindle comprises a motor device, which is arranged in the housing and which is coupled to the loading device; and
wherein the motor device linear displacement of the at least one linearly movable rod of the loading device, and the at least one linearly movable rod of the loading device in turn can drive linear displacement of the at least one linearly movable rod of the first tool and second tool;
holding the workpiece in a single chucking arrangement;
machining the workpiece with the first tool and then with the second tool;
wherein the first tool and the second tool are respectively held on the at least one tool spindle, and the at least one tool spindle effects rotation of the corresponding tool about a rotational axis; and
acting on and displaying by means of the motor device, the at least one linearly movable rod of the first tool or the second tool;
wherein the linear displacement of the at least one linearly movable rod of the first tool or second tool effects a transverse movement of at least one cutting edge or cutting edge arrangement of the respective tool in relation to the rotational axis.

21. The method according to claim 20, wherein the displacement of the at least one linearly movable rod of the first tool or second tool occurs in a controlled manner.

22. The method according to claim 20, wherein a contact pressure of the first tool or the second tool onto the workpiece is adjusted by means of the displacement of corresponding at least one linearly movable rod of said first tool or second tool.

23. The method according to claim 20, wherein wear of the first tool or second tool is compensated by means of the displacement of the at least one linearly movable rod of said first tool or second tool.

24. The method according to claim 20, wherein the machining center further comprises a machine bed, the at least one workpiece support is arranged on the machine bed, and the at least one workpiece support is displaceable on the machine bed in a third direction perpendicular to the first direction and the second direction.

25. The method according to claim 20, wherein the second tool is a honing tool.

26. The method according to claim 20, wherein the workpiece is cleaned after the machining operation with the first tool and before machining with the second tool.

27. The method according to claim 20, wherein the first tool and the second tool are held by the same tool spindle one after the other.

28. The method according to claim 20, wherein a diameter measurement of a bore is conducted on a workpiece by means of a dynamic pressure measurement.

29. The method according to claim 20, wherein the motor device is coupled to the loading device by a ball screw drive, which is arranged in the housing.

* * * * *